(12) United States Patent
Tate et al.

(10) Patent No.: US 8,755,611 B2
(45) Date of Patent: Jun. 17, 2014

(54) INFORMATION PROCESSING APPARATUS AND INFORMATION PROCESSING METHOD

(75) Inventors: Shunta Tate, Tokyo (JP); Yusuke Mitarai, Tokyo (JP); Hiroto Yoshii, Tokyo (JP); Yasuhiro Okuno, Tokyo (JP); Katsuhiko Mori, Kawasaki (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 13/207,143

(22) Filed: Aug. 10, 2011

(65) Prior Publication Data

US 2012/0045120 A1 Feb. 23, 2012

(30) Foreign Application Priority Data

Aug. 18, 2010 (JP) ................................. 2010-183391

(51) Int. Cl.
*G06K 9/68* (2006.01)

(52) U.S. Cl.
USPC .......................................................... 382/218

(58) Field of Classification Search
USPC ......... 382/103, 159, 173, 216, 218, 224, 225, 382/228, 254
See application file for complete search history.

(56) References Cited

U.S. PATENT DOCUMENTS

| | | | |
|---|---|---|---|
| 5,754,686 A | 5/1998 | Harada et al. | |
| 5,781,663 A | 7/1998 | Sakaguchi et al. | |
| 5,835,632 A | 11/1998 | Takasu et al. | |
| 5,982,933 A | 11/1999 | Yoshii et al. | |
| 6,009,199 A | 12/1999 | Ho | |
| 6,035,062 A | 3/2000 | Takasu et al. | |
| 6,052,482 A | 4/2000 | Arai et al. | |
| 6,208,755 B1 | 3/2001 | Mori et al. | |
| 6,212,298 B1 | 4/2001 | Yoshii et al. | |
| 6,233,352 B1 | 5/2001 | Yoshii | |
| 6,351,561 B1 * | 2/2002 | Iyengar ......................... | 382/226 |
| 6,373,473 B1 | 4/2002 | Sakaguchi et al. | |
| 6,421,461 B1 | 7/2002 | Arai et al. | |
| 6,671,403 B1 | 12/2003 | Takasu et al. | |
| 7,039,233 B2 | 5/2006 | Mori et al. | |
| 7,054,850 B2 | 5/2006 | Matsugu | |
| 7,274,819 B2 | 9/2007 | Matsugu | |
| 7,502,494 B2 * | 3/2009 | Tafuku et al. ................. | 382/118 |
| 7,577,297 B2 | 8/2009 | Mori et al. | |
| 7,783,581 B2 * | 8/2010 | Hosoi et al. ..................... | 706/12 |

(Continued)

OTHER PUBLICATIONS

P. Viola, et al., "Rapid object detection using a boosted cascade of simple features," Proc. of CVPR, 2001.

(Continued)

*Primary Examiner* — Daniel Mariam
(74) *Attorney, Agent, or Firm* — Fitzpatrick, Cella, Harper & Scinto

(57) ABSTRACT

An information processing apparatus that discriminates the orientation of a target includes a calculation unit that calculates a distribution of a difference in feature amount between a plurality of learning patterns each showing the orientation of a target, a determination unit that determines, using a probability distribution obtained from the distribution of differences calculated by the calculation unit, a pixel that is in an input pattern and is to be referred to in order to discriminate the orientation of a target in the input pattern, and a discrimination unit that performs discrimination for obtaining the orientation of the target in the input pattern by comparing a feature amount of the pixel determined by the determination unit and a threshold set in advance.

18 Claims, 15 Drawing Sheets

(56) References Cited

U.S. PATENT DOCUMENTS

| | | | |
|---|---|---|---|
| 7,801,337 B2 * | 9/2010 | Akahori et al. | 382/118 |
| 7,881,524 B2 | 2/2011 | Matsugu et al. | |
| 7,912,253 B2 | 3/2011 | Suzuki et al. | |
| 7,995,805 B2 | 8/2011 | Suzuki et al. | |
| 8,368,815 B2 * | 2/2013 | Tsurumi | 348/699 |
| 2006/0074653 A1 | 4/2006 | Mitari et al. | |
| 2006/0115157 A1 | 6/2006 | Mori et al. | |
| 2007/0217688 A1 * | 9/2007 | Sabe et al. | 382/226 |
| 2009/0089235 A1 | 4/2009 | Torii et al. | |
| 2009/0157707 A1 | 6/2009 | Ito et al. | |
| 2009/0219405 A1 | 9/2009 | Kaneda et al. | |
| 2009/0324060 A1 | 12/2009 | Sato et al. | |
| 2010/0329556 A1 | 12/2010 | Mitarai et al. | |
| 2011/0075937 A1 | 3/2011 | Tate | |
| 2011/0091115 A1 | 4/2011 | Kato et al. | |
| 2011/0158535 A1 | 6/2011 | Iio et al. | |
| 2011/0158540 A1 | 6/2011 | Suzuki et al. | |

OTHER PUBLICATIONS

A. Torralba, et al., "Sharing visual features for multiclass and multiview object detection", IEEE Trans. on Pattern Analysis and Machine Intelligence, vol. 29, No. 5, pp. 854-869, 2007.

N. Dalal, et al., "Histograms of Oriented Gradients for Human Detection", IEEE Computer Vision and Pattern Recognition, pp. 886-893, 2005.

S. B. Choe, et al., "Modeling Head and Hand Orientation During Motion Using Quaternions", SAE Transactions, vol. 113, Pt. 1, pp. 186-192, 2004.

Q. Xu, et al., "Active Constrained Clustering by Examining Spectral Eigenvectors", Proc of Discovery Science, 2005.

U.S. Appl. No. 13/194,640, filed Jul. 29, 2011. Applicant: Yuji Kaneda, et al.

U.S. Appl. No. 13/281,115, filed Oct. 25, 2011. Applicant: Hiroto Yoshii.

U.S. Appl. No. 13/218,976, filed Aug. 26, 2011. Applicant: Yusuke Mitarai, et al.

U.S. Appl. No. 13/207,190, filed Aug. 10, 2011. Applicatn: Hiroto Yoshii, et al.

Shinpei Masuda, et al., "Speculative variable selection method for quick online learning of classification tasks", Technical Report of the Institute of Electronics, Information and Communication Engineers, Japan, the Institute of Electronics, Information and Communication Engineers, Mar. 8, 2007, vol. 106 No. 589, p. 129-134.

Shinmura Shuichi, "Fusion of OR and statistics Optimal Linear Discriminant Functions Using Mathematical Programing(5)", Management Science, Operations Research, Japan, Operations Research Society of Japan, May 1, 2002, vol. 47, No. 5, p. 315-321.

* cited by examiner

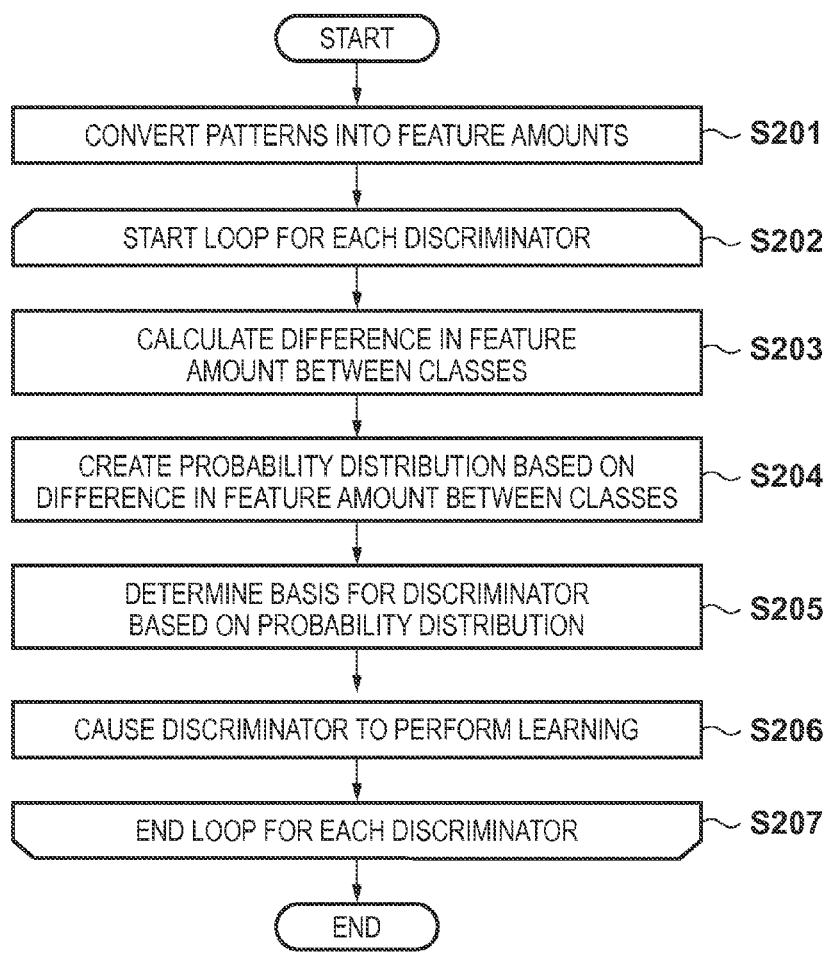

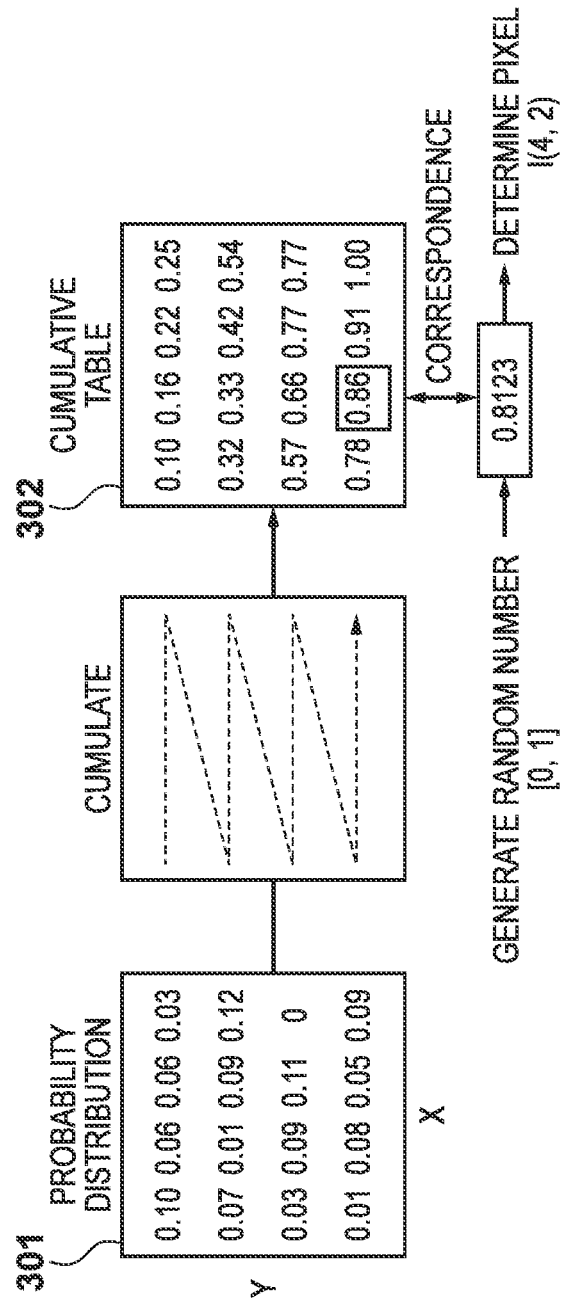

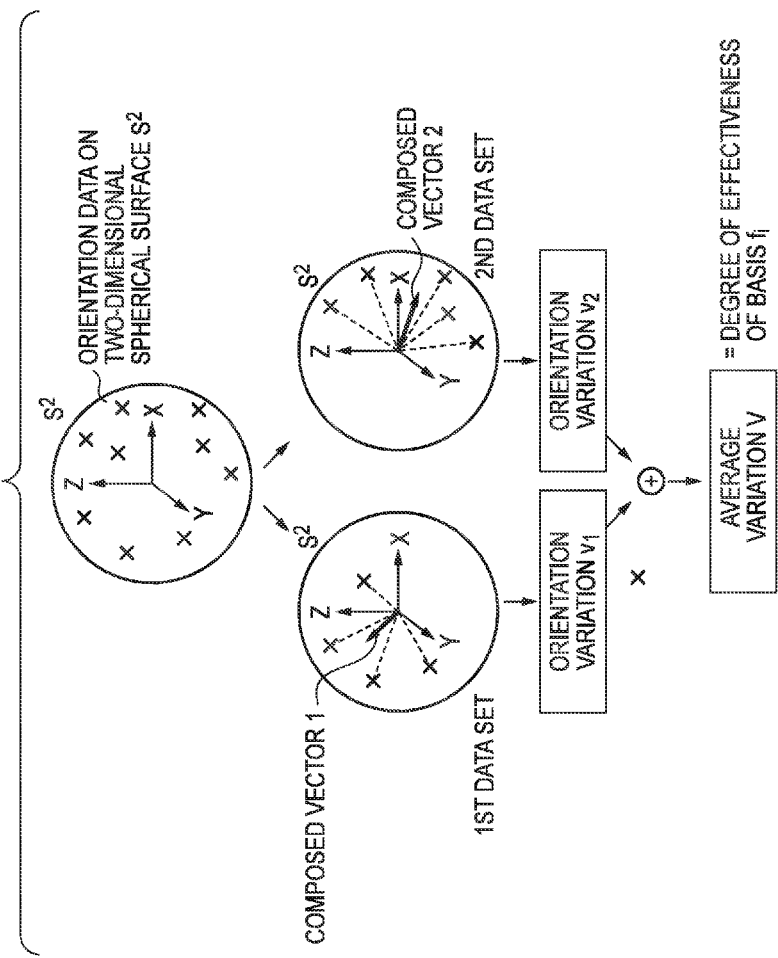
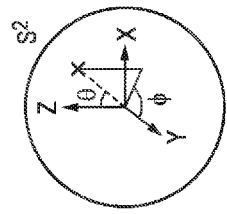
FIG. 7A
FIG. 7B

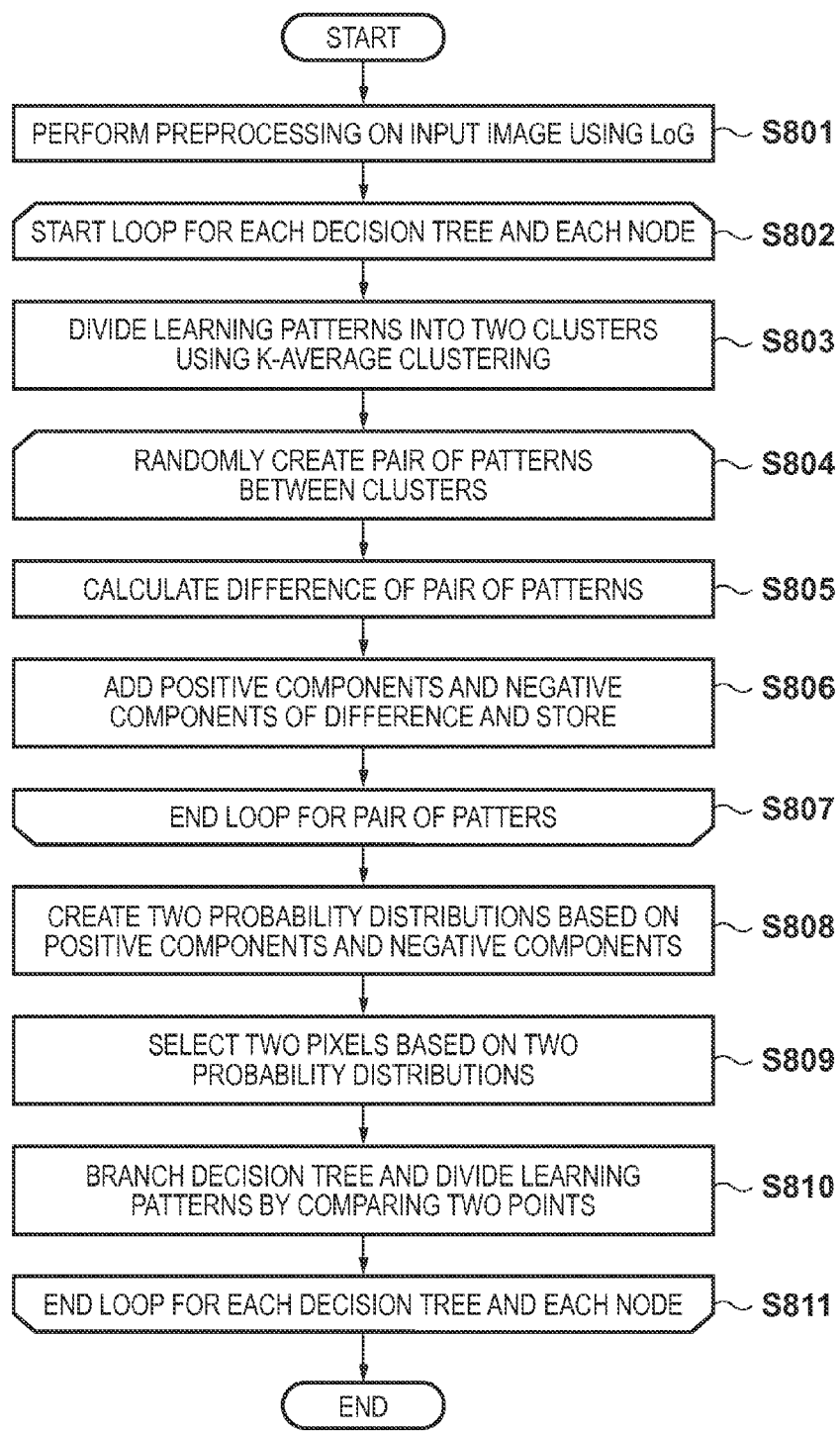

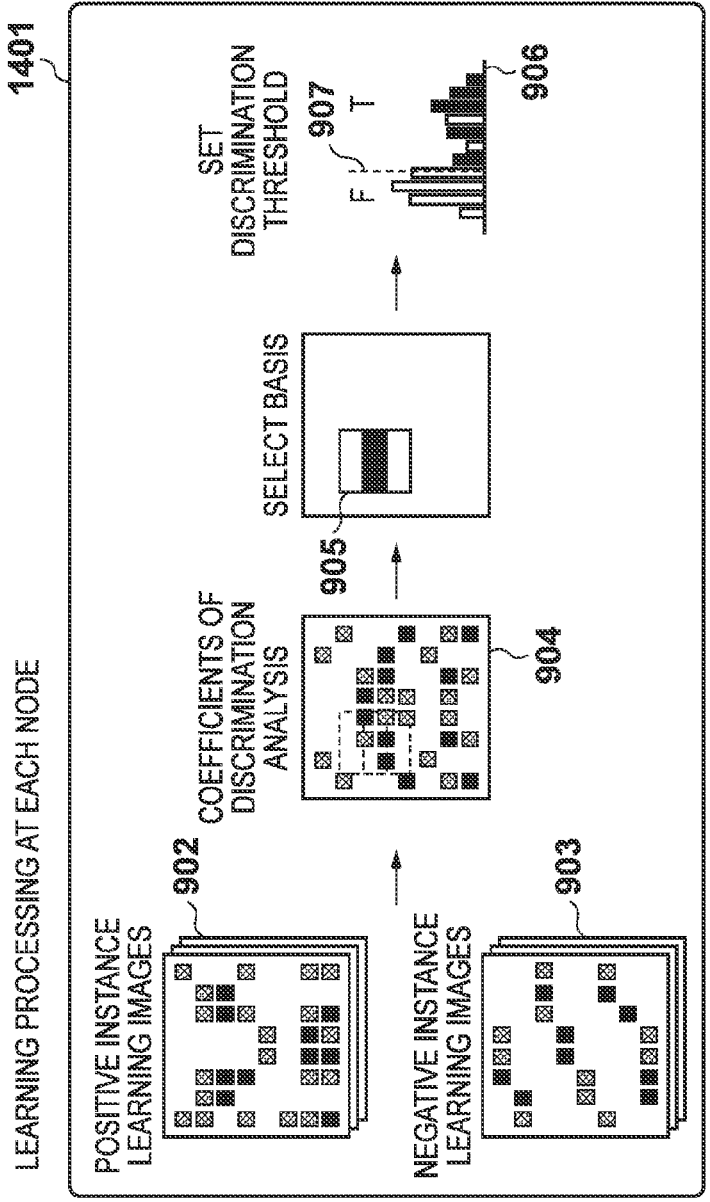

though there is a possibility that an effective basis may be overlooked or only an insufficient number of bases can be selected. In the ensemble learning method, due to the characteristics of that technique, a generalization error will not be reduced unless there are sufficient variations of effective weak discriminators (weak discriminators whose expected value of a discrimination accuracy rate is greater than 0.5). Accordingly, it is desirable to use a pool including as many candidates for a basis as possible and as many weak discriminators as possible. However, in that case, a problem of an increase in the amount of calculation and the amount of data during learning and detection arises.

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of the Related Art

Conventionally, as machine learning technology for pattern recognition, there is a technique called an ensemble learning method for identification with high precision by performing identification using a plurality of identification discriminators and integrating the identification results (see for example, the U.S. Pat. No. 6,009,199). The principle of identification according to the ensemble learning method is that even with discriminators with a large estimation variance value (weak discriminators), if a plurality of discriminators (weak discriminators) are collected, and identification is performed by majority decision, variance of estimated values becomes small. Examples of an ensemble learning technique include techniques such as bagging, boosting, and random forest.

In image recognition based on the ensemble learning technique, as an input to a weak discriminator, a basis function for feature amount conversion of a certain type is often used, such as the Haar basis function, (see P. Viola and M. Jones, "Rapid object detection using a boosted cascade of simple features," Proc. of CVPR and 2001: Non-Patent Document 1 below) and matching with a local patch (see A. Torralba, K. Murphy, W. Freeman, Sharing visual features for multiclass and multiview object detection, IEEE Trans. on Pattern Analysis and Machine Intelligence, Vol. 29, no. 5, pp. 854-869, 2007: Non-Patent Document 2), for example. In many ensemble learning techniques, each weak discriminator selects a different basis function, and discriminates and learns learning data in space secured by the basis function. At that time, a sparse basis function that refers to only a portion of an image or so-called integral image (Non-Patent Document 1), for instance, is used in many cases. Since the number of times of referring to data can be suppressed by using "integral image", high-speed discrimination can be realized.

Note that if feature amount conversion functions are a small finite set, an optimal basis function to be given to a weak discriminator can be searched for in a round robin manner. However, generally, the source of conversion functions is uncountable and infinite, and thus a round robin search cannot normally be attempted. At such a time, conversion functions are randomly selected in an appropriate range so as to determine a basis function. Specifically, approximation is performed using a method in which a pool of bases where sufficient candidates for a conversion function are randomly selected is created, and an optimal basis function is selected from the pool, for instance.

Issues with pattern recognition application include a task of identifying a slight difference in the orientation or shape of a target object. For example, when assembly of industrial products is automated, a demand for identification of components based on whether or not a small notch is provided may arise. Further, for picking of components performed by a manipulator, there may be a demand for distinguishing between differences in orientation even with identical components. Here, a task of identifying patterns with a slight difference in space as described is called a problem of identifying classes that are "similar but not the same" (space used here includes not only two-dimensional space of an image, but also certain feature space).

Also, if improvement in precision is pursued in an issue of recognizing classes that are not explicitly "similar but not the same", it will be necessary to appropriately identify a target in such a class to some extent.

If "similar but not the same" class identification is performed by ensemble learning, in a method of selecting an optimal basis function in a round robin manner, overfitting to noise, not to an actual difference, may occur, and a truly effective basis may not be selected. Further, in a method of randomly selecting bases, there is a possibility that an effective basis may be overlooked or only an insufficient number of bases can be selected. In the ensemble learning method, due to the characteristics of that technique, a generalization error will not be reduced unless there are sufficient variations of effective weak discriminators (weak discriminators whose expected value of a discrimination accuracy rate is greater than 0.5). Accordingly, it is desirable to use a pool including as many candidates for a basis as possible and as many weak discriminators as possible. However, in that case, a problem of an increase in the amount of calculation and the amount of data during learning and detection arises.

SUMMARY OF THE INVENTION

In view of the above problem, the present invention provides information processing technology for enabling preferential selection of a basis function effective in pattern recognition from among countless choices of basis functions in feature amount space.

According to one aspect of the present invention, there is provided an information processing apparatus comprising: a calculation unit adapted to calculate a distribution of a difference in feature amount between a plurality of learning patterns each showing an orientation of a target; a determination unit adapted to determine, using a probability distribution obtained from the distribution of differences calculated by the calculation unit, a pixel that is in an input pattern and is to be referred to in order to discriminate an orientation of a target in the input pattern; and a discrimination unit adapted to perform discrimination for obtaining the orientation of the target in the input pattern by comparing a feature amount of the pixel determined by the determination unit and a threshold set in advance.

According to the present invention, it is possible to provide information processing technology for enabling preferential selection of a basis function effective in pattern recognition from among countless choices of basis functions in feature amount space.

Further features of the present invention will become apparent from the following description of exemplary embodiments with reference to the attached drawings.

BRIEF DESCRIPTION OF THE DRAWINGS

FIG. 2A is a diagram illustrating a basic processing procedure of the pattern recognition method according to the present embodiment.

FIG. 3A is a diagram illustrating processing for determining a pixel in accordance with a probability distribution as an example.

FIGS. 7A and 7B are diagrams schematically illustrating processing for calculating variation in orientation data according to the second embodiment.

FIG. 8 is a diagram illustrating the flow of pattern recognition processing according to a third embodiment.

FIGS. 9A to 9C are diagrams showing the configuration in which weak discriminators are connected and an example of a result of a pattern recognition process according to a fourth embodiment.

DESCRIPTION OF THE EMBODIMENTS

First Embodiment

Figure 1A:
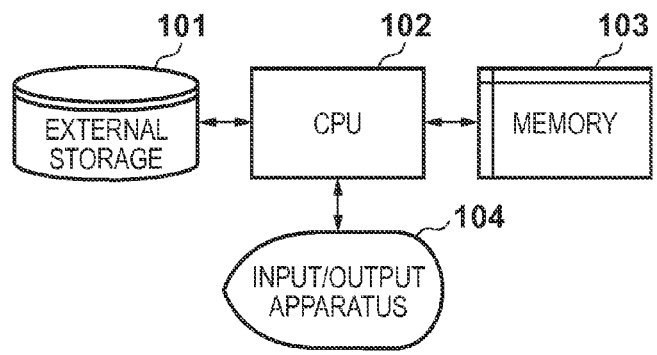
FIG. 1A is a diagram illustrating the configuration of an information processing apparatus that can execute a pattern recognition method according to an embodiment of the present invention.

The configuration of an information processing apparatus that can execute a pattern recognition method according to an embodiment of the present invention is described with reference to FIG. 1A. Although here, examples of a "pattern" to be recognized can include a still image, a moving image, an audio signal, document data, and the like, the gist of the present invention is not limited to these examples. A specific example is that using a still image obtained by capturing a target as a pattern to be recognized, information on the name of the target, a category, a three-dimensional position, the orientation, and the like is estimated. A target here includes an arbitrary object, and examples thereof include a person, a person's face, an internal organ, an industrial product, a car, a semiconductor substrate, and the like.

The information processing apparatus is provided with an external storage apparatus 101, a central processing unit (CPU) 102, a memory 103, and an input/output apparatus 104, and is able to execute a pattern recognition method under the overall control of the central processing unit (CPU) 102. The external storage apparatus 101 holds a pattern recognition program for causing a computer to execute processing steps of the pattern recognition method, learning patterns used for the execution of the pattern recognition method, a dictionary created using the learning patterns, and the like. Further, the external storage apparatus 101 can also hold the recognition result of a new pattern derived using the pattern recognition method. The central processing unit (CPU) 102 can manage execution of the pattern recognition program.

The central processing unit (CPU) 102 can control the operation of the external storage apparatus 101, the memory 103, and the input/output apparatus 104. The memory 103 can temporarily store data to be referred to when a subroutine of the pattern recognition program or the pattern recognition program is executed by the central processing unit (CPU) 102. Further, the memory 103 can also temporarily hold the recognition result of a new pattern derived using the pattern recognition method. The input/output apparatus 104 accepts instructions from a user, and has an input unit that takes in a new pattern to be recognized, and an output unit that outputs a pattern recognition result to another information processing apparatus, a control apparatus that controls, for example, a robot, and the like. If a two-dimensional image is used as a pattern to be recognized, the input unit of the input/output apparatus 104 can also capture a target object by functioning as a camera.

The user can also instruct an execution of the pattern recognition program via the input/output apparatus 104, as a trigger to start the execution thereof. Further, the input/output apparatus 104 has a display unit for displaying the pattern recognition result, and the user can also confirm the pattern recognition result displayed on the display unit. Further, the input/output apparatus 104 has a key boat, and the user can set parameters of the pattern recognition program via the key boat.

Figure 1B:
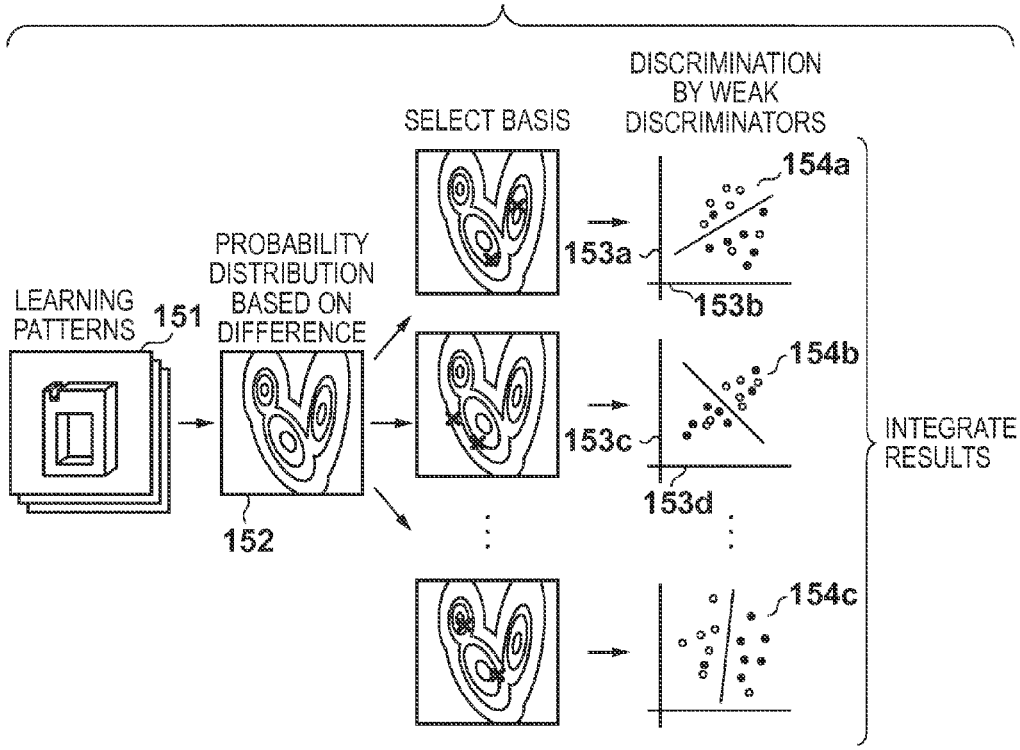
FIG. 1B is a schematic diagram schematically showing the flow of processing of the pattern recognition method.

FIG. 1B is a schematic diagram schematically showing the flow of processing of the pattern recognition method according to the first embodiment of the present invention. First, using patterns (learning patterns) 151 that show the form of a recognition target, a probability distribution 152 is created based on the difference in feature amount between the learning patterns 151. Then, bases are selected in accordance with the probability distribution 152, and selection from among feature amount bases 153a, 153b, 153c, and so on is performed for each of weak discriminators 154a, 154b, 154c and so on, thereby performing ensemble learning.

Next is a description of a basic processing procedure of the pattern recognition method according to the present embodiment with reference to FIG. 2A. In the present embodiment, a classification issue, an example of which is orientation estimation of a target object (component), is assumed to be solved. When images of a component are given as patterns of learning images, the orientation of that component is identified by the application of the pattern recognition method. Here, a task of identifying several kinds of orientation classes is assumed. It is assumed that as learning patterns, images of a plurality of variations such as those with a difference in lighting conditions and a slight difference in appearance of how, for instance, the size or a tilt looks are prepared for one orientation class.

Although the present invention is widely applicable to the ensemble learning method using a large number of discriminators, this invention is applied to a random forest method as one of such methods in the present embodiment (see the U.S. Pat. No. 6,009,199). Random forest is a technique of performing pattern recognition using a plurality of decision trees. A query concerning information generated based on a certain random criterion is made at each node of the decision trees, and learning patterns are sequentially divided according to the result of the query. A learning pattern that remains when a leaf node is reached is stored as a classification result at that leaf node. When discrimination is performed, the same information queries as those during learning are made with regard to an input pattern, thereby following nodes from the root node to a leaf node. When a leaf node is reached, a pattern stored therein is taken as a discrimination result of the decision tree. The discrimination results of all the decision trees are integrated by voting or the like, and the obtained result is taken as a final discrimination result.

Learning is performed for each of the decision trees. First, in step S201, all patterns of learning images (pattern images) are converted into feature amounts. In the present embodiment, aiming at robust identification against illumination fluctuation, Laplacian of Gaussian (hereinafter, represented as "LoG") processing is performed, thereby obtaining an edge intensity image. Next, processing from steps S202 to S207 is performed with respect to each of the weak discriminators of the decision trees.

In step S203, a distribution of the difference in feature amount between classes is calculated within a pattern. Here, specifically, a feature amount is the edge intensity according to LoG, and a value of the difference is a ratio F of the variance within an orientation class to the variance between orientation classes. F is obtained for each pixel as shown by the following expression.

$$F(x, y) = \frac{\sum_C n_c \cdot (m(x, y) - m_c(x, y))^2}{\sum_C \sum_{I \in C} (m_c(x, y) - I(x, y))^2}$$ [Expression 1]

Note that I(x, y) represents the edge intensity of a pixel at coordinates (x, y), $m_c$(x, y) represents an average value of the edge intensity of an orientation class C, m(x, y) represents an average value of the edge intensity of all patterns, and $n_c$ represents the number of image patterns of each orientation class.

Figure 2B:
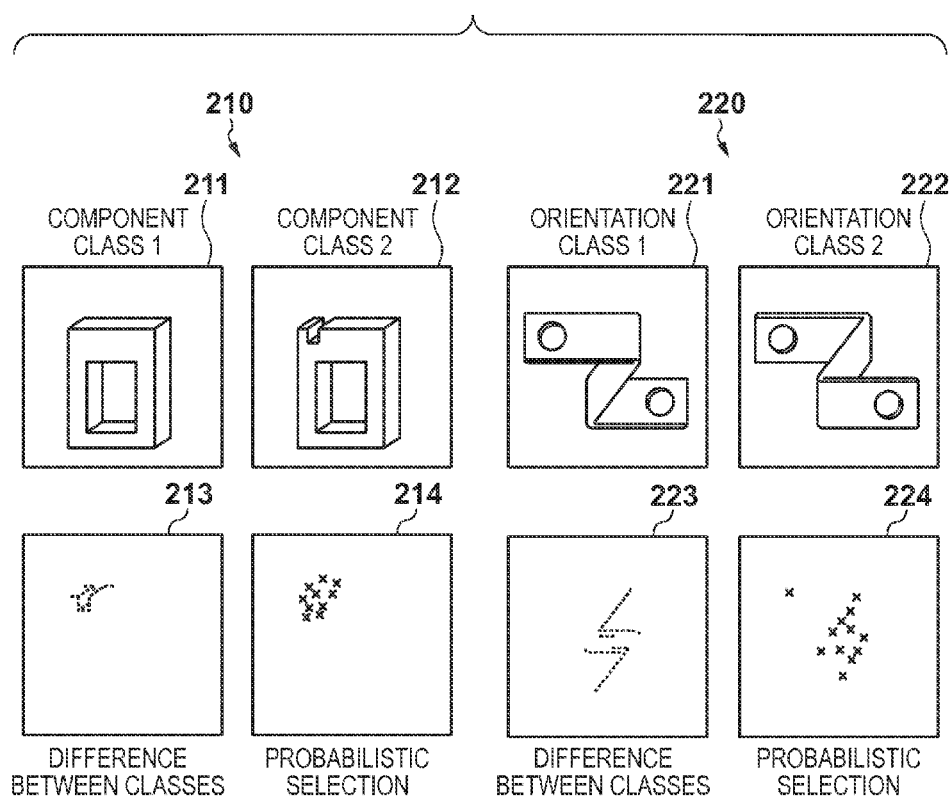
FIG. 2B is a diagram schematically showing differences between classes.

Here, reference numeral 220 of FIG. 2B indicates diagrams schematically showing the difference between different orientation classes. The variance ratio of an image 221 of an orientation class 1 to an image 222 of an orientation class 2 is obtained so as to obtain a distribution 223 of the difference between the two classes. An image 224 showing the result of probabilistic selection shows a plurality of positions of pixels probabilistically selected based on the difference distribution. Here, although only two orientation classes are shown in order to simplify the illustration, in the present embodiment, a variance ratio is calculated with respect to all the orientation classes of the patterns to be discriminated, in practice. Note that when, for instance, a long processing time is required because there are many target learning patterns at the root node or the like, some patterns may be randomly sampled from a set of the learning patterns, and then calculation may be performed using the small number of samples.

Next, in step S204, a probability distribution P is created based on the ratio F of the variance within the orientation class to the variance between the orientation classes. Here, it is sufficient to use the following expression, for example.

$$P(x, y) = \frac{1}{Z} \exp\left[-\frac{\rho}{F(x, y)}\right]$$ [Expression 2]

Note that Z represents a normalization parameter for achieving $\Sigma\Sigma P(x, y) = 1$, and $\rho$ represents a tuning parameter for determining how much the level of the variance ratio is reflected in the probability distribution. If $\rho \to 0$, the probability is close to a uniform distribution. Specifically, the distribution in this case is a distribution that does not take into consideration the level of the variance ratio.

Next, in step S205, a basis referred to by each node (each weak discriminator) for discrimination is determined using the probability distribution P. In normal random forest, a basis is a value (feature amount) of any one pixel, and a pixel randomly referred to is determined in accordance with the probability distribution P. FIG. 3A shows a specific example as a method of determination based on the probability distribution. First, the value of a probability P(x, y) for each pixel in a probability distribution 301 is added in the raster direction, thereby generating a cumulative value table 302. A random number in the range of 0 to 1 is generated, and a pixel corresponding to the value of the random number is selected. In the case of FIG. 3A, a pixel I(4, 2) in the cumulative table that has a value of 0.86 that is closest to the random number 0.8123 is selected.

Next, in step S206, a discriminator performs learning. Here, a value of the edge intensity (feature amount) at one point in an image and a threshold $\xi$ randomly set in advance are compared. As a result of the comparison, learning image patterns are classified into two groups, and two new nodes are generated. This is the learning in the discriminators. Then, for the divided patterns, steps S203 to S206 described above are also repeated at subsequent nodes. When a decision tree reaches a prescribed depth or the number of divided patterns becomes smaller than or equal to a prescribed number in this way, the nodes are taken as the leaf nodes. The frequency of the remaining learning pattern orientation class is stored in the leaf nodes.

Figure 3B:
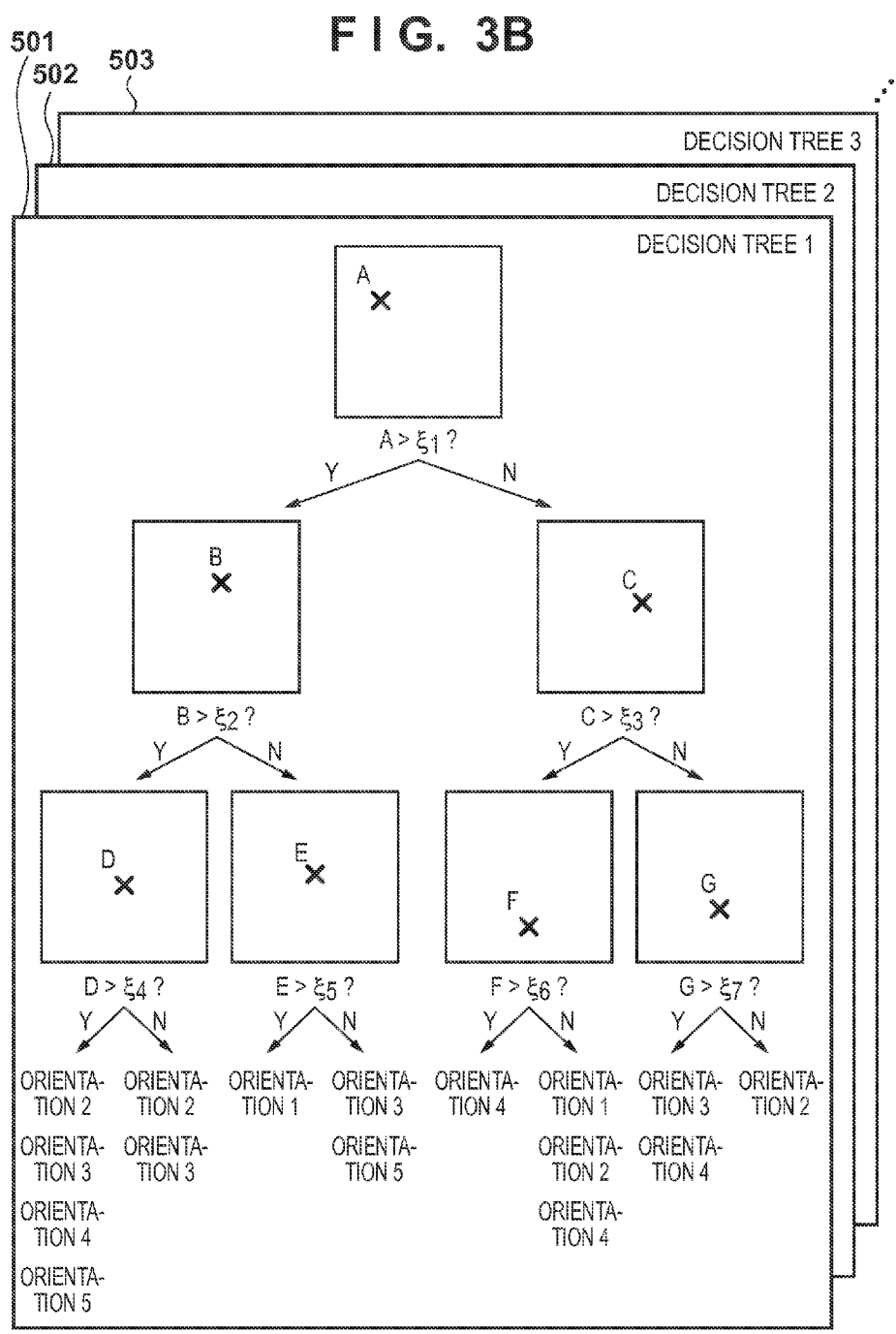
FIG. 3B is a diagram illustrating generation of a decision tree in a pattern recognition process as an example.

FIG. 3B shows an example of the operation in the present embodiment. Here, a small tree whose depth is 4 is shown to simplify the description. Note that in order to reduce the number of times for which a meaningless comparison is performed, a threshold may be appropriately set by referring to the distribution of learning data. At the nodes of a decision tree 1, pixels A, B, C, D, and E are respectively compared with thresholds $\xi_1$, $\xi_2$, $\xi_3$, $\xi_4$, and $\xi_5$, and branching is performed depending on the determination results of the comparison, and a leaf node is reached in the end, and thereby orientation discrimination results can be obtained. Similarly, orientation discrimination results can be obtained with regard to decision trees 2 and 3.

Figure 4A:
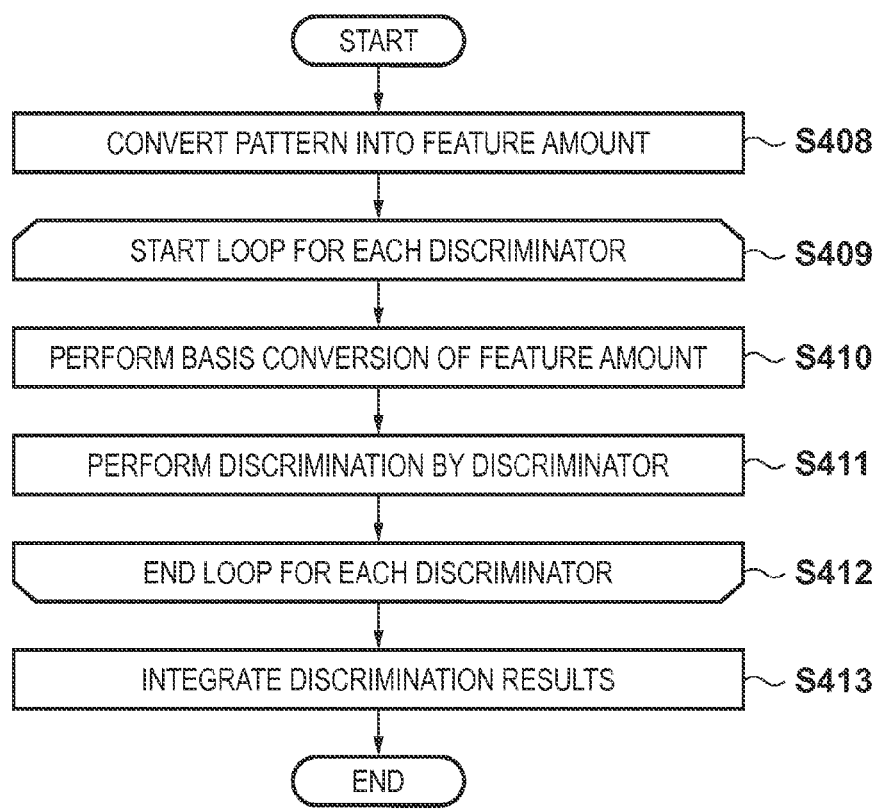
FIG. 4A is a diagram illustrating the flow of pattern recognition processing according to a first embodiment.
Figure 4B:
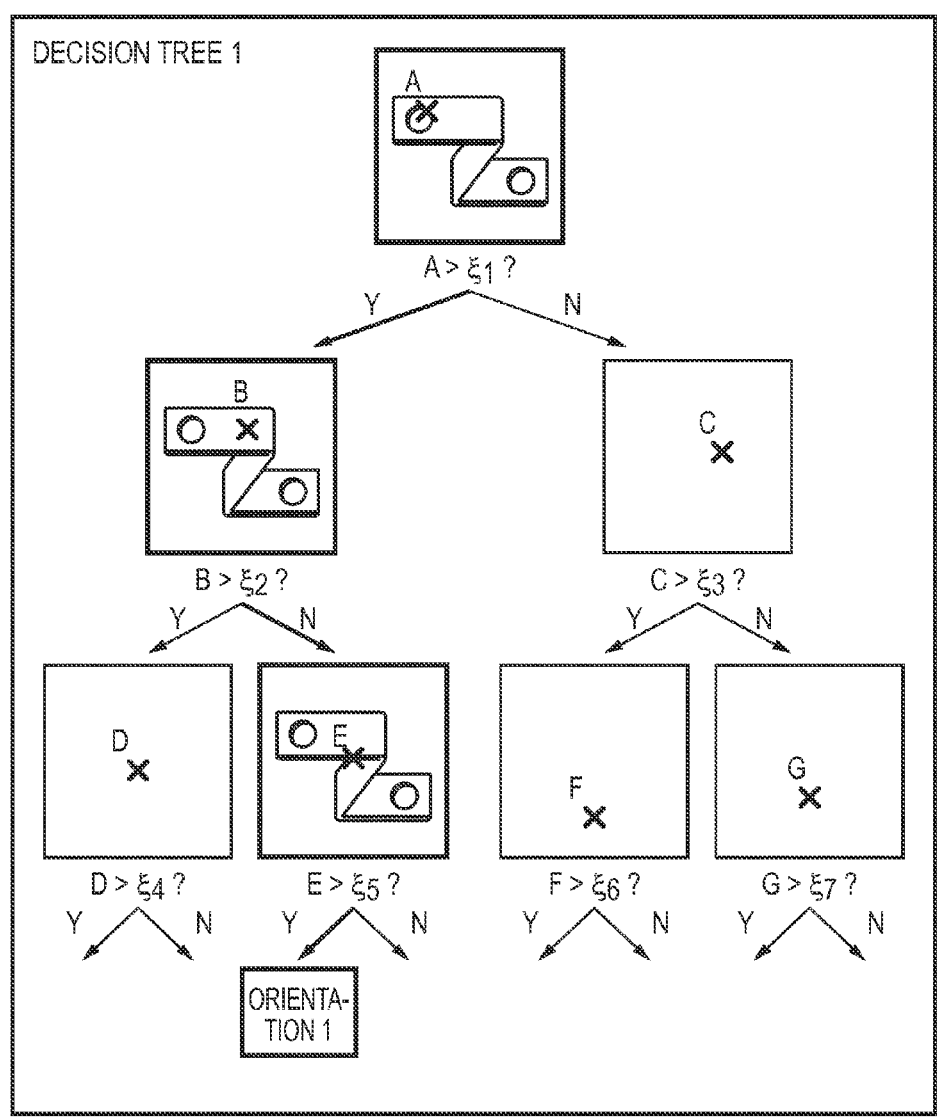
FIG. 4B is a diagram illustrating generation of a decision tree in a pattern recognition process according to the first embodiment, as an example.

Next is a detailed description of discrimination processing in the present embodiment with reference to the operation flowchart in FIG. 4A. FIG. 4B shows an example of operation and a result of discrimination processing. Discrimination processing is executed by discrimination of an input image independently performed using each decision tree and integration of the results thereof. First, in step S408, an input image is converted into a feature amount using the same technique (here, LoG) as that used when preprocessing was performed during learning. Next, the root node of a decision tree is set as an initial position. Then, steps S409 to step S412 are repeated at each node.

In step S410, the same pixel as that during learning is selected for the node, and the value thereof is observed. Then, in step S411, comparison with the threshold randomly determined during learning is performed. In the example of operation shown in FIG. 4B, at each node of the decision tree 1, pixels A, B, and E are respectively compared with thresholds $\xi_1$, $\xi_2$, and $\xi_5$, and branching to the left, to the right, and to the left is performed depending on the determination results of the comparison, and a leaf node is reached in the end, thereby obtaining the discrimination result indicating "Orientation 1".

In the case of the decision trees used in the present embodiment, it is necessary to note that a set of patterns to be classified at each node changes every moment due to the division of patterns, and thus a probability distribution created based on the pattern difference value and the pattern difference changes at the nodes. Patterns are subdivided by branching as the leaf nodes are approached from the root node, and detailed comparison in which a pattern difference is specialized is performed. Accordingly, patterns can be classified efficiently.

In order to avoid a generalization error, a devised configuration may be adopted in which the tuning parameter ρ is adjusted as appropriate. For example, the value of ρ may be changed according to the node depth. Specifically, a method is conceivable in which ρ is set to 0 at a node at an early stage of the discrimination, thereby not taking the difference between patterns into much consideration, and the value of ρ is gradually increased. Further, as another devised configuration, for example, ρ is set to 0 at half of the nodes, and a basis is selected without consideration of the probability distribution, and ρ is set to 1 at the other half of the nodes, and a basis is selected in consideration of the probability distribution. A devised configuration of repeating these in an alternating manner is also conceivable.

Figure 5:
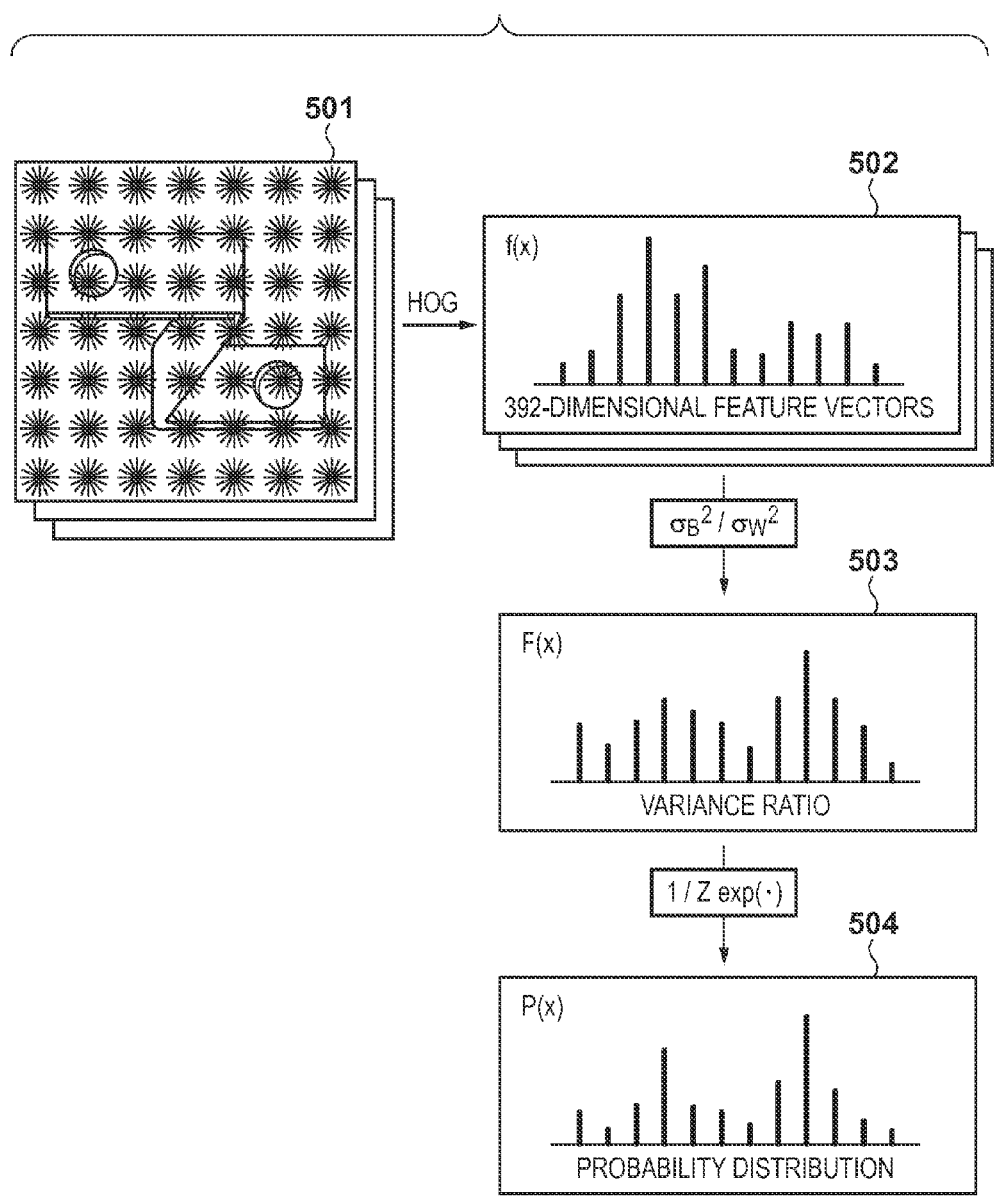
FIG. 5 is a diagram illustrating a modification of the first embodiment.

Note that although LoG is used as preprocessing for conversion to a feature amount in the present embodiment, the gist of the present invention is not limited to this. As long as the feature amount conversion is effective in identifying a pattern class, any feature amount conversion can be a candidate therefor. It is sufficient to select appropriate conversion depending on a pattern to be recognized and conditions. For example, HOG (Histogram of Oriented Gradient) (see N. Dalal and B. Triggs, Histograms of Oriented Gradients for Human Detection, IEEE Computer Vision and Pattern Recognition, 886-893, 2005: Non-Patent Document 3) or the like can also be selected. Below is a brief description of a modification of the present embodiment. For example, as shown in the schematic diagram in FIG. 5, learning images of a component in a pattern set 501 are each converted into an HOG feature amount made of 7×7 cells. Since each cell has values of the luminance gradients in eight directions, a pattern of one learning image is converted into 392-dimensional feature vectors 502. With regard to the 392-dimensional feature amounts, a variance ratio distribution 503 is created by obtaining a variance ratio of all patterns for each dimension, and a probability distribution 504 is created using the same method as that described above. Each discriminator selects one of the dimensions of the HOG feature amounts as a basis according to the probability distribution 504, and divides learning data by comparison with a random value.

Note that although a variance ratio is used as an index indicating the difference between pattern classes serving as the source of the probability distribution in the present embodiment, another index may be used. Specifically, utilization of mutual information $I(X; Y)$ using both a feature amount value X and a class label Y as variables is also conceivable. Further, if one class has only one pattern data, utilization of a standard deviation between feature amount classes is also conceivable. The present embodiment is applicable to various indices by appropriately performing normalization. In practice, an effective index will be selected in consideration of a feature amount to be used, a recognition task, and the like.

Second Embodiment

In the first embodiment, the issue of orientation identification is solved as an issue of classification by using the ensemble of classification trees. However, for this, it is necessary to divide the orientations into a limited number of clusters in advance, which causes a problem in that the validity of a clustering method or optimal angular resolution is unknown. In a second embodiment, an orientation estimation issue is not solved as a class classification issue, but rather a numerical value representing the orientation is directly estimated using regression trees.

A regression tree is a technique used for approximation of a function. Although the structure thereof is almost the same as that of a classification tree, the difference therebetween is that each leaf node is associated with a numerical value that a function should output with respect to an input, rather with a pattern class. In the present embodiment, an input is an image of a component, and outputs are a polar angle θ and an angle of deviation φ that represent values of the orientation of an object. Here, assuming that there is no difference in planar rotation of the orientation to simplify a description, a task of estimating the orientation with two degrees of freedom is considered.

With an ordinary regression tree, data is divided by using candidates for a feature amount in a round robin manner, and then an optimal feature amount is selected so as to branch a decision tree. Specifically, it is common to select a feature amount such that the variation in two groups after dividing variables to be estimated (values of the orientation, here) is the smallest. Then, this is repeated at each node and branching and division of data is performed.

Figure 11:
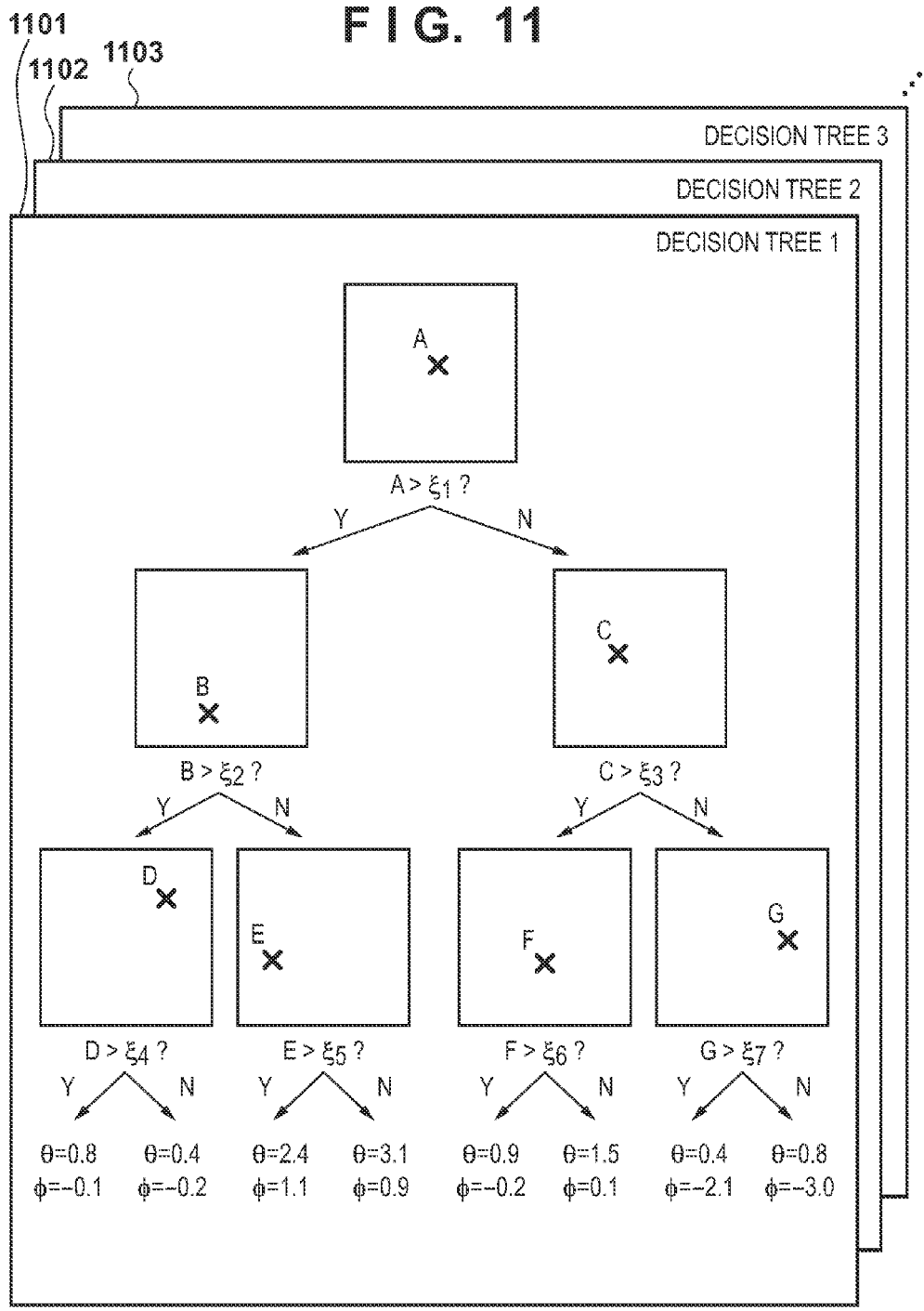
FIG. 11 is a diagram illustrating generation of a regression tree in a learning process according to the second embodiment, as an example.

In the ensemble learning technique of the present embodiment, rather than selecting an optimal feature amount as a basis, a probability distribution is created by evaluating a value of the variation after division, such that an effective feature amount is preferentially selected. Then, a feature amount is selected based on the probability distribution, and set as a basis. An example of processing in the present embodiment is shown in FIG. 11. Here, a small tree whose depth is 4 is shown to simplify the description. Note that in order to reduce the number of times for which a meaningless comparison is performed, a threshold may be appropriately set by referring to the distribution of learning data. At each node of a decision tree 1, pixels A, B, C, D, and E are respectively compared with thresholds $\xi_1$, $\xi_2$, $\xi_3$, $\xi_4$, and $\xi_5$, and branching is performed depending on the determination results thereof, and a leaf node is reached in the end, and thereby a discrimination result indicating values of the orientation can be obtained. Similarly, discrimination results indicating values of the orientation can also be obtained with regard to decision trees 2 and 3.

Figure 6:
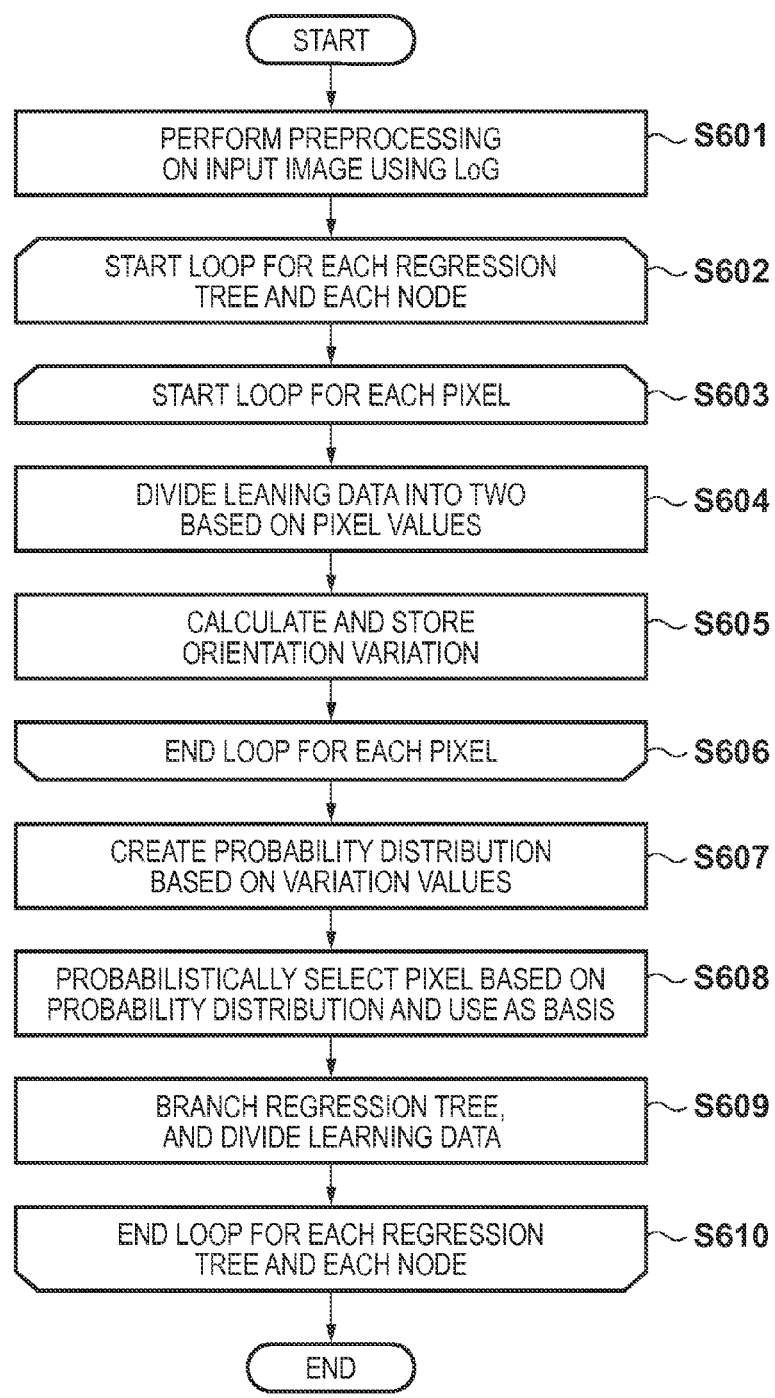
FIG. 6 is a diagram illustrating the flow of pattern recognition processing according to a second embodiment.

The flow of pattern recognition processing in the second embodiment will be described with reference to FIG. 6. First, in step S601, preprocessing is performed using LoG as in the first embodiment. Then, for each node, the extent to which effective division will be performed if the patterns to be discriminated are divided while focusing on different pixels is evaluated. Specifically, in step S604, by a comparison with a value of a pixel serving as an appropriate threshold (which is basis fi), data is divided into two areas, namely, a pattern group with a large pixel value indicating a feature amount and a pattern group with a small pixel value indicating a feature amount (first data set, second data set). Next, in step S605, in the two pattern groups after division, as a value of a pixel (feature amount), an index V of directional variation of the orientation is calculated. The index V of variation will be described below. The variation index V is stored for each pixel as a degree of effectiveness serving as a basis of the pixel. Note that as the above division threshold, for example, a value is used that causes the number of data pieces to be equally divided as much as possible. Alternatively, a value with which the index V will be maximized may be used.

Below is a description of a method of calculating the variation index V. Here, as in FIG. 7A, a two-dimensional spherical surface $S^2$ as the space of the orientation and an orientation data group distributed thereon are considered. The orientation is expressed with the polar angle θ and the angle of deviation φ. Conversion from the polar angle θ and the angle of deviation φ to coordinates x, y, and z can be performed by Expression 3 below.

$$X = r \sin\theta \cos\phi$$

$$Y = r \sin\theta \sin\phi$$

$$Z = r \cos\theta \qquad \text{[Expression 3]}$$

If a mean vector of the orientation is composed from n orientation data pieces, using the values of these coordinates, the length is obtained by Expression 4 below.

$$L = \frac{1}{n}\left(\left(\sum_i x_i\right)^2 + \left(\sum_i y_i\right)^2 + \left(\sum_i z_i\right)^2\right)^{\frac{1}{2}} \qquad \text{[Expression 4]}$$

Here, a value defined by Expression 5 below is a value reflecting the variation of n orientation data pieces.

$$v = 1 - L \qquad \text{[Expression 5]}$$

The directional variation of the orientation is the largest when v=0, and the variation is the largest when v=1. The average of the variation of two groups (the first data set, the second data set) when data is divided into two groups respectively including $n_1$ data pieces and $n_2$ data pieces can be obtained by Expression 6 below. An average variation V is assumed to be a variable of the degree of effectiveness of discrimination of each basis (FIG. 7B). The average variation V indicates the degree of effectiveness of the basis fi.

$$V = \frac{(n_1 - 1)v_1 + (n_2 - 1)v_2}{n_1 + n_2 - 2} \qquad \text{[Expression 6]}$$

Subsequent processing has many common portions with that in the first embodiment. In step S607, a probability distribution P(x, y) is created from a variable V(x, y). In step S608, a pixel is probabilistically selected and used as a basis, and in step S609, a regression tree is branched, and data is divided. At leaf nodes, remaining orientation data is averaged so as to obtain an average direction, and that direction is stored. As a method of averaging the orientation, it is sufficient to compose a mean vector so as to obtain the polar angle and angle of deviation thereof, and assume the angles as the values of the orientation as described above, for example.

When estimating the orientation, an input image is given, each regression tree is traversed, and values of the orientation are obtained for the regression tree. These values are averaged, and the averaged values are taken as the final estimation result of the orientation. Here, general robust estimation such as M estimation may be used so as to robustly obtain a result even if the output results include an outlier.

Here, although estimation of the orientation with two degrees of freedom is described without consideration of planar rotation, a configuration is conceivable in which free orientation with three degrees of freedom including planar rotation is estimated as another embodiment. Although a basic configuration is the same as the case of two degrees of freedom, it is necessary to represent the direction of orientation using a quaternion in the case of three degrees of freedom. In order to evaluate the variation of the orientation after division, it is necessary to define the difference between the directions of the orientation and the average thereof.

This is defined as follows. First, with a quaternion whose length in the direction of the orientation is 1 being expressed with q, the angular difference that is the difference between two orientations is defined with respect to another orientation p as Expression 7 below.

$$dist(q,p) = \arccos(q \cdot p) \qquad \text{[Expression 7]}$$

Next, some calculation methods of averaging the orientation using a quaternion including an approximation method have been proposed (for example, see Choe, S. B. Faraway, J. J., Modeling Head and Hand Orientation During Motion Using Quaternions, SAE Transactions, VOL 113, PART 1, p.p. 186-192, 2004: Non-Patent Document 4). If the same calculation as that using the above method is performed using these, the variation of the orientation after division can be evaluated. In this way, the present embodiment is also applicable to the case of the orientation with three degrees of freedom.

Third Embodiment

A third embodiment describes identification of the type of three or more objects using decision trees to which the present invention is applicable. Although various targets such as an artifact and a general object can be considered as objects, here, specifically, it is assumed to perform identification using industrial components as an example. Conditions are assumed to be such that there are many component types, and one learning image is given to each component type. Specifically, here, pattern identification with multiple classes each having one pattern will be solved. As shown by a component class 211 and a component class 212 in FIG. 2B, learning data is assumed to include components that are partially alike, but need to be appropriately distinguished depending on whether the component has a notch.

In the present embodiment, as in the first embodiment, a plurality of decision trees are used as an ensemble of classification trees. In the present embodiment, it is assumed that a decision tree is branched by comparing values of two pixels.

If patterns in two classes are distinguished as a simple example, it can be expected that comparatively reliable discrimination is performed by obtaining the difference of the patterns between the classes, and comparing one pixel somewhere in a positive value area and one pixel somewhere in a negative value area. However, since multiple classes each having one pattern are handled in the present embodiment, a devised configuration as described below is used.

The flow of pattern recognition processing in the third embodiment will be described with reference to FIG. 8. The flow of processing during learning in the present embodiment will be described. In the present embodiment, first, in step S801, preprocessing such as LoG is performed on an input image. Processing from steps S802 to S811 is repeated. Next, based on a value of a feature amount obtained by preprocessing, in step S803, learning patterns are divided into two clusters using k-average clustering, for convenience. Next, in step S804, a pair is created by randomly selecting one pattern each from the two clusters obtained by division in step S803 previously performed, and in step S805, the difference value between the two patterns is calculated for each pixel. In step S806, the values are divided into positive components and negative components, and the absolute value thereof is added individually, and the added results are stored. Steps S804 to S807 are repeated for a prescribed number of times, thereby obtaining two images respectively showing a distribution of positive value components and a distribution of negative value components. These are normalized in step S808, and two probability distributions are created using the same technique as that in the first embodiment.

Then, in step S809, two points are probabilistically determined in accordance with these two probability distributions. A method of probabilistic selection from a cumulative map based on a probability distribution may also be performed as in the first embodiment. Then, in step S810, in order to recognize a target by comparing the feature amounts at two points, learning patterns are divided and a tree is branched, in accordance with the comparison result. At this time, new division is performed without consideration of the cluster division result previously obtained. As described above, division is further performed, and processing for branching a tree is repeated until only one pattern remains at a node. If a node having only one pattern is reached, the type of pattern is stored therein, and that node is set as a leaf node. Note that a query according to which either of the nodes will have no pattern at a certain point is assumed to be invalid, and selection is performed again.

Note that at the time of clustering, in order to reduce the amount of calculation, clustering may be performed using a set obtained by partially sampling data in a random manner, rather than using all data. Further, the method of clustering is not limited to k-average clustering, and for example, a spectral clustering technique (see Qianjun Xu, Marie desJardins and Kiri L. Wagstaff. Active Constrained Clustering by Examining Spectral Eigenvectors. Proc of Discovery Science 2005: Non-Patent Document 5) or the like may be used. It is sufficient to perform selection in consideration of the trade-off between the property of data and the amount of calculation. Further, when a discriminator compares two points, a configuration may be adopted in which the points are compared after adding a random threshold to either of the points, as in the first embodiment in which a threshold is provided. The above is a learning operation flow of the pattern recognition technique of the present embodiment. During discrimination, a plurality of decision trees formed in this way are separately traversed, and a pattern when a leaf node is reached is taken as a discrimination result of the decision tree. Majority decision is performed using all the decision trees, and a pattern with the highest frequency of occurrence is taken as a discrimination result. As a modification of the present embodiment, for example, a configuration may be adopted in which pixel information at one point is compared with a random value at each node, as in the first embodiment. As the difference of images between classes, it is also possible to create a probability distribution, utilizing the standard deviation of pixels of patterns, for example.

Fourth Embodiment

Figure 9A:
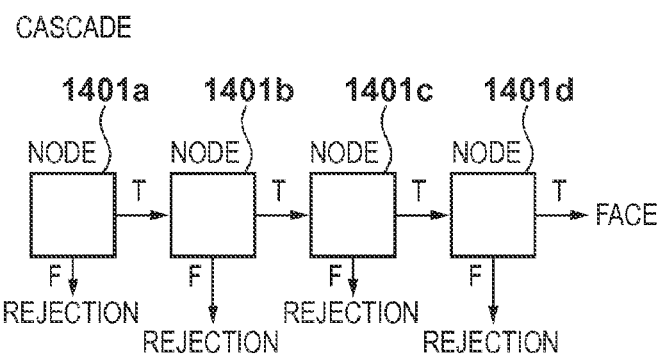

A fourth embodiment describes an example in which the present invention is applied to a detection task of a person's face. The framework of issue setting and the configuration of a discriminator here basically follow the configuration according to Viola and Jones in Non-Patent Document 1. Viola and Jones cause a weak discriminator to learn using the Adaboost technique (see Non-Patent Document 1), and multistage determination is performed using a so-called cascade structure shown in FIG. 9A. Accordingly, pattern recognition of two classes, namely, face and non-face is performed. Further, a pattern whose value is much less than a discrimination threshold and that can be obviously determined as not being a face is rejected at each stage, and thus high-speed determination is possible. The inventors improve this with the application of the present invention.

Viola and Jones use the Haar basis function as a feature amount to be given to a weak discriminator. There are about 40,000 variations in the case of a Haar basis function with at most four sub-domains for a 24×24 resolution image. Viola and Jones try all these variations in a round robin manner, and a Haar basis according to which a misdiscrimination rate is the lowest at that point in time is selected. If the resolution of an image is increased so as to be higher than 24×24, or a Haar basis with a more complicated pattern is to be used, the number of variations will be enormous, and thus it is impossible to try the variations for a realistic time period in a round robin manner.

Figure 10:
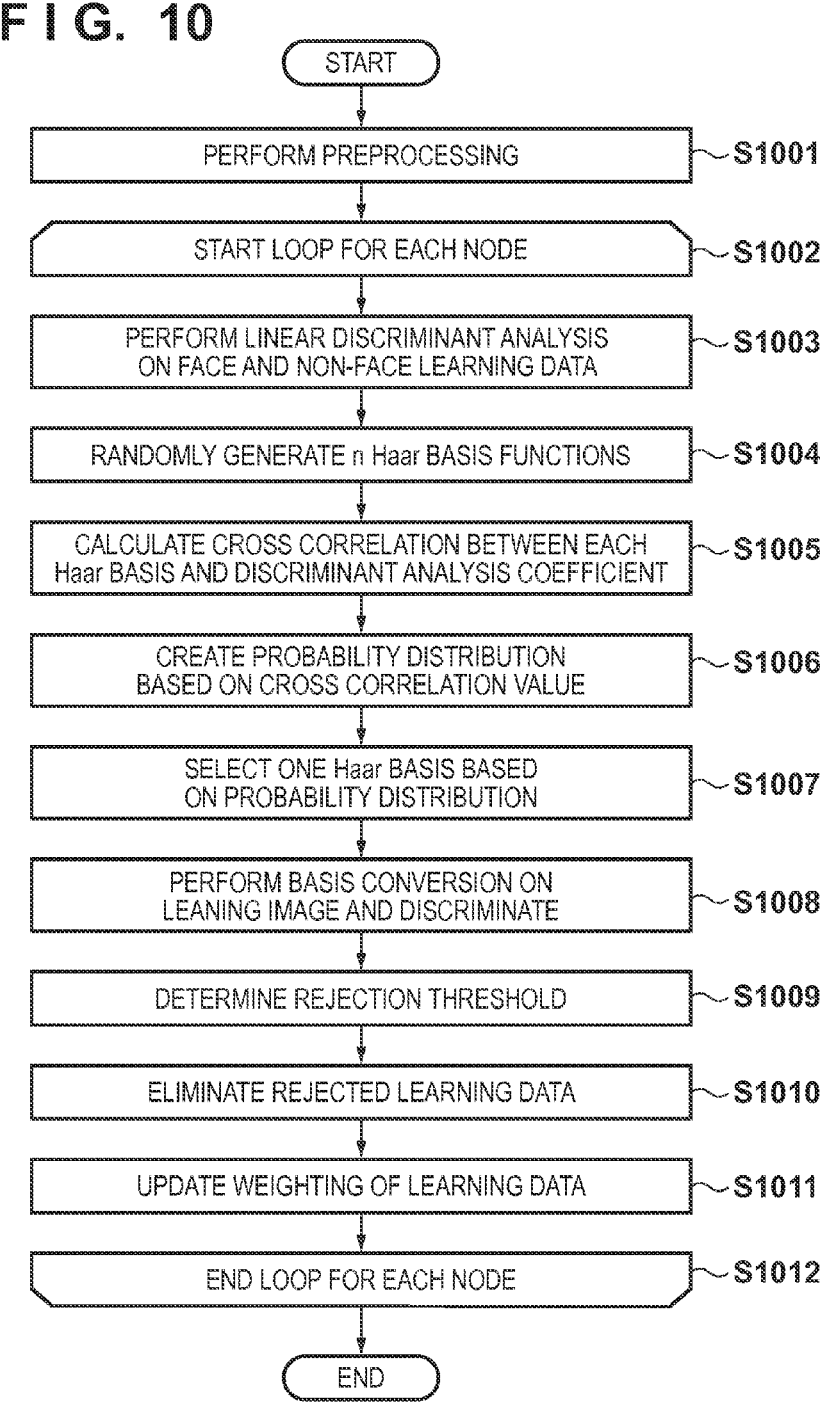
FIG. 10 is a diagram illustrating the flow of pattern recognition processing according to the fourth embodiment.

In view of this, in the present embodiment, a probability distribution is created based on the difference in feature amount between patterns, and an effective basis is preferentially selected. The flow of pattern recognition processing in the fourth embodiment will be described with reference to FIG. 10. Further, an example of operation at one node during learning is shown in FIG. 9C as a schematic diagram. Below is a description particularly focusing on the differences from Non-Patent Document 1.

First, a distribution of the difference between classes is obtained. In the present embodiment, in step S1003, linear discriminant analysis is performed on data indicating learning images 902 in a face class (positive instance learning images) and learning images 903 in a non-face class (negative instance learning images). As a result of linear discriminant analysis, one basis that maximizes the variance ratio of two classes is obtained. This basis is a conversion basis for compressing n-dimensional space corresponding to n pixels into one dimensional space. An example of a result showing conversion basis coefficients is denoted by reference numeral 904. It should be noted that the coefficients 904 are real values and include positive values and negative values.

If a Haar basis that well matches these coefficients is preferentially selected, it can be expected that two classes are efficiently discriminated. Although various methods of realizing this are conceivable, this is realized by the following operation, for example, in the present embodiment. First, in step S1004, n Haar bases are randomly generated. An example of one Haar basis is denoted by reference numeral 905.

Next, in step S1005, a score indicating the degree of matching between the n Haar bases and the basis coefficients 904 of linear discriminant analysis is measured. Specifically, for example, it is sufficient to obtain a value of normalized correlation (cross correlation) as a score. Then, bases with a large absolute value of normalized correlation are considered to be effective bases, and these bases are preferentially selected from among the n bases. In step S1006, using the same method as that used in the first embodiment, the value of the score indicating the degree of matching is normalized, and converted into a probability distribution. Then, in S1007, a table of a cumulative distribution is created in the same way as in the first embodiment, and one Haar basis is probability selected, and assumed to be a basis 906 for the discrimination (S1008). After that, a rejection threshold is determined (S1009), the rejected learning data is eliminated (S1010), and weighting of learning data is updated (S1011). Learning is performed based on Adaboost using the same method as that in Non-Patent Document 1. Since the way of weighting of misdiscrimination data and the way of setting of a discrimination threshold 907 are sufficiently disclosed in Non-Patent Document 1, a description thereof is omitted here. In this way, discriminators are caused to learn.

During detection, it is determined with respect to the entire area of an image whether or not the image is a face by performing scanning processing using so-called sliding windows as in Non-Patent Document 1. Further, in order to handle different sizes in appearance, a plurality of determinations are made using hierarchy images with a plurality of resolutions.

Figure 9B:
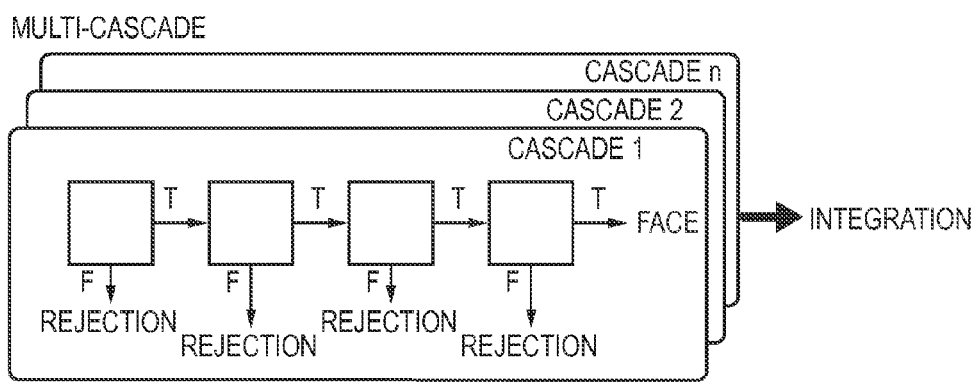

Note that although one basis function is selected, and discrimination and determination of a threshold is performed in one-dimensional space in the present embodiment, space where a weak discriminator performs discrimination is not limited to one dimensional space in an embodiment to which the present invention is applicable. For example, a configuration is also conceivable in which two or more basis functions are selected so as to secure multi-dimensional space, and data is discriminated. Accordingly, it is possible to realize the expression of a combination of more complicated Haar bases. As a technique of discrimination of a weak discriminator, for example, a support vector machine adopting a soft margin or the like can be used. Note that in order to obtain the effect of combination, it is more preferable to include nonlinear conversion, such as a case where conversion is performed with a Haar basis function, and thereafter the result is further squared. Although the present embodiment describes a realization configuration using only one cascade of a weak discriminator as in FIG. 9A in accordance with the technique of Viola and Jones, a configuration is also conceivable in which discrimination results are integrated based on the majority decision using the ensemble of cascades as in FIG. 9B. In this configuration, it can be expected that ensemble learning is performed using the randomness of basis selection in a more effective manner.

According to the embodiments described above, it is possible to provide technology for enabling preferential selection of a basis function effective in pattern recognition from among choices of countless basis functions in feature quantity space.

Further, the way to select a basis function is not determinate, and thus various variations of weak discriminators are maintained. In this way, the precision of identification can be increased compared with the conventional ensemble learning technique as a result. The amount of calculation and the amount of data during learning and detection can be further reduced.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183391, filed Aug. 18, 2010, which is hereby incorporated by reference herein in its entirety.

What is claimed is:

1. An apparatus comprising:
a calculation unit configured to calculate a distribution of a difference in feature amount between a plurality of learning patterns;
a first generation unit configured to generate a probability distribution by normalizing the distribution of the difference calculated by the calculation unit;
a determination unit configured to determine, based on the probability distribution, a pixel in the learning pattern; and
a second generation unit configured to generate a discriminator based on the determined pixel in the learning pattern, wherein at least one processor functions as at least one of the units.

2. The apparatus according to claim 1, further comprising:
a division unit configured to divide the learning patterns into two clusters; and
a unit configured to select one pattern each from the two clusters obtained by division by the division unit, and calculate the difference in feature amount between the selected patterns,
wherein the determination unit determines, using the probability distribution obtained by normalizing a positive component of the difference and a probability distribution obtained by normalizing a negative component of the difference, two pixels that are in the input pattern.

3. The apparatus according to claim 1,
wherein the discriminator configures nodes of a decision tree.

4. The apparatus according to claim 1, further comprising:
a division unit configured to divide an area of the learning patterns into two areas by comparing a value of a pixel in the learning patterns with a threshold; and
a unit configured to calculate variation of feature amounts with respect to each of the areas obtained by division by the division unit, and calculate an average of the calculated variation of the feature amounts,
wherein the determination unit determines, using the probability distribution obtained by normalizing the calculated average of the variation of the feature amounts, the pixel that is in the input pattern.

5. The apparatus according to claim 1,
wherein the discriminator configures nodes of a regression tree.

6. The apparatus according to claim 1, further comprising
a discrimination unit configured to perform discrimination of an input pattern based on the generated discriminator.

7. The apparatus according to claim 6, wherein the generated discriminator discriminates the input pattern by comparing a feature amount of a pixel in the input pattern, the position of the pixel in the input pattern which is the same position of the determined pixel in the learning pattern, and a threshold set in advance.

8. The apparatus according to claim 6,
wherein the determination unit determines a plurality of pixels in the learning pattern, based on the probability distribution;
wherein the generated discriminator discriminates the input pattern by comparing feature amounts of a plurality of pixels in the input pattern, and positions of the plurality of pixels which are the same position of the plurality of determined pixels in the learning pattern.

9. The apparatus according to claim 6,
wherein the discrimination unit performs discrimination of an orientation of an object in the input pattern based on the generated discriminator.

10. The apparatus according to claim 6,
wherein the discrimination unit performs discrimination of an object in the input pattern based on the generated discriminator.

11. The apparatus according to claim 1, wherein the input pattern includes a component.

12. An method executed by an apparatus, the method comprising:
a calculation step of calculating a distribution of a difference in feature amount between a plurality of learning patterns;

a first generation step of generating a probability distribution by normalizing the distribution of the difference calculated in the calculation step;

a determination step of determining, based on the probability distribution, a pixel that is in the learning pattern; and a second generation step of generating a discriminator based on the determined pixel in the learning pattern.

13. A non-transitory computer-readable storage medium that stores a program for causing a computer to execute the method according to claim 12.

14. An apparatus comprising:

a calculation unit configured to calculate a distribution of a difference in feature amount between a plurality of learning patterns;

a generation unit configured to generate a probability distribution by normalizing the distribution of the difference calculated by the calculation unit;

a determination unit configured to determine, based on the probability distribution, a basis of the feature amount in an input pattern; and a discrimination unit configured to perform discrimination of the input pattern by using the basis of the feature amount determined by the determination unit and a threshold set in advance, wherein at least one processor functions as at least one of the units.

15. The apparatus according to claim 14, wherein the basis is a dimension of the feature amount.

16. The apparatus according to claim 14, wherein the basis is a basis function.

17. A method executed by an apparatus, the method comprising:

a calculation step of calculating a distribution of a difference in feature amount between a plurality of learning patterns;

a generation step of generating a probability distribution by normalizing the distribution of the difference calculated in the calculation step;

a determination step of determining, based on the probability distribution, a basis of the feature amount in an input pattern; and a discrimination step of performing discrimination of the input pattern by using the basis of the feature amount determined in the determination step and a threshold set in advance.

18. A non-transitory computer-readable storage medium that stores a program for causing a computer to execute the method according to claim 17.

* * * * *